United States Patent
Chen

(10) Patent No.: US 7,017,871 B2
(45) Date of Patent: Mar. 28, 2006

(54) ELECTRIC APPLIANCE STAND WITH SIMPLE TELESCOPIC SUPPORT ROD

(76) Inventor: Chung-Yang M. Chen, 3F, No. 2, Lane 497, Chung-Cheng Rd., Hsintien City, Taipei County (TW)

( * ) Notice: Subject to any disclaimer, the term of this patent is extended or adjusted under 35 U.S.C. 154(b) by 0 days.

(21) Appl. No.: 10/385,739

(22) Filed: Mar. 12, 2003

(65) Prior Publication Data

US 2004/0149869 A1    Aug. 5, 2004

(30) Foreign Application Priority Data

Jan. 30, 2003  (TW) ................. 92201999 U

(51) Int. Cl.
*F16M 11/00* (2006.01)
*F12L 4/00* (2006.01)

(52) U.S. Cl. .................. 248/161; 362/98; 362/287; 362/191

(58) Field of Classification Search ............ 248/161, 248/157, 125.9, 126; 362/295, 270, 98; D26/60
See application file for complete search history.

(56) References Cited

U.S. PATENT DOCUMENTS

| | | | | |
|---|---|---|---|---|
| 1,010,335 A * | 11/1911 | Wiliams | ................. | 362/270 |
| 1,278,488 A * | 9/1918 | McCann | ................. | 40/357 |
| 1,783,278 A * | 12/1930 | Brady | ................. | 248/207 |
| 2,524,461 A * | 10/1950 | McDowell | ................. | 362/295 |
| 2,528,990 A * | 11/1950 | Atwood | ................. | 248/451 |
| 2,595,406 A * | 5/1952 | Popovich | ................. | 417/236 |
| 2,909,316 A * | 10/1959 | Prohaczka et al. | ................. | 416/5 |
| D204,792 S * | 5/1966 | Collings | ................. | D26/60 |
| 3,325,639 A * | 6/1967 | King | ................. | 362/270 |
| 3,917,940 A * | 11/1975 | Duddy | ................. | 362/398 |
| D271,526 S * | 11/1983 | Zeller | ................. | D26/60 |
| 4,432,042 A * | 2/1984 | Zeller | ................. | 362/183 |
| 4,581,684 A * | 4/1986 | Mazzucco | ................. | 362/98 |
| 4,850,804 A * | 7/1989 | Huang | ................. | 416/246 |
| 4,928,217 A * | 5/1990 | Laske | ................. | 362/427 |
| 5,180,220 A * | 1/1993 | Van Kalsbeek | ................. | 362/98 |
| 5,464,182 A * | 11/1995 | Stekelenburg | ................. | 248/276.1 |
| D382,286 S * | 8/1997 | Doran | ................. | D16/242 |
| 5,695,271 A * | 12/1997 | Zeller | ................. | 362/98 |
| 5,725,356 A * | 3/1998 | Carter | ................. | 416/240 |
| 5,767,905 A * | 6/1998 | Archambo | ................. | 348/373 |
| 5,791,763 A * | 8/1998 | Kam-Hoi | ................. | 362/183 |
| 6,276,819 B1 * | 8/2001 | Gordner | ................. | 362/398 |
| D450,147 S * | 11/2001 | Leen | ................. | D26/60 |
| 6,419,370 B1 * | 7/2002 | Chen | ................. | 362/98 |
| 6,454,539 B1 * | 9/2002 | Santos | ................. | 417/44.1 |
| 2003/0179572 A1 * | 9/2003 | Schnell | ................. | 362/191 |

* cited by examiner

*Primary Examiner*—Anita M. King
(74) *Attorney, Agent, or Firm*—Troxell Law Office, PLLC

(57) ABSTRACT

Electric appliance stand with simple telescopic support rod, including a telescopic operable arm. A lower end of the operable arm is pivotally disposed on a base seat and an upper end of the operable arm is pivotally connected with a connecting seat. The base seat is composed of a locating block and a support arm. A hinge member is disposed on the locating block for pivotally connecting with the lower end of the operable arm. A support arm is fixed on the locating block and outward extends therefrom to form a stable seat body. A small-size electric appliance can be replaceably connected on the connecting seat and supported by the stand. In use or after folded, the stand has small volume and can be conveniently carried.

5 Claims, 4 Drawing Sheets

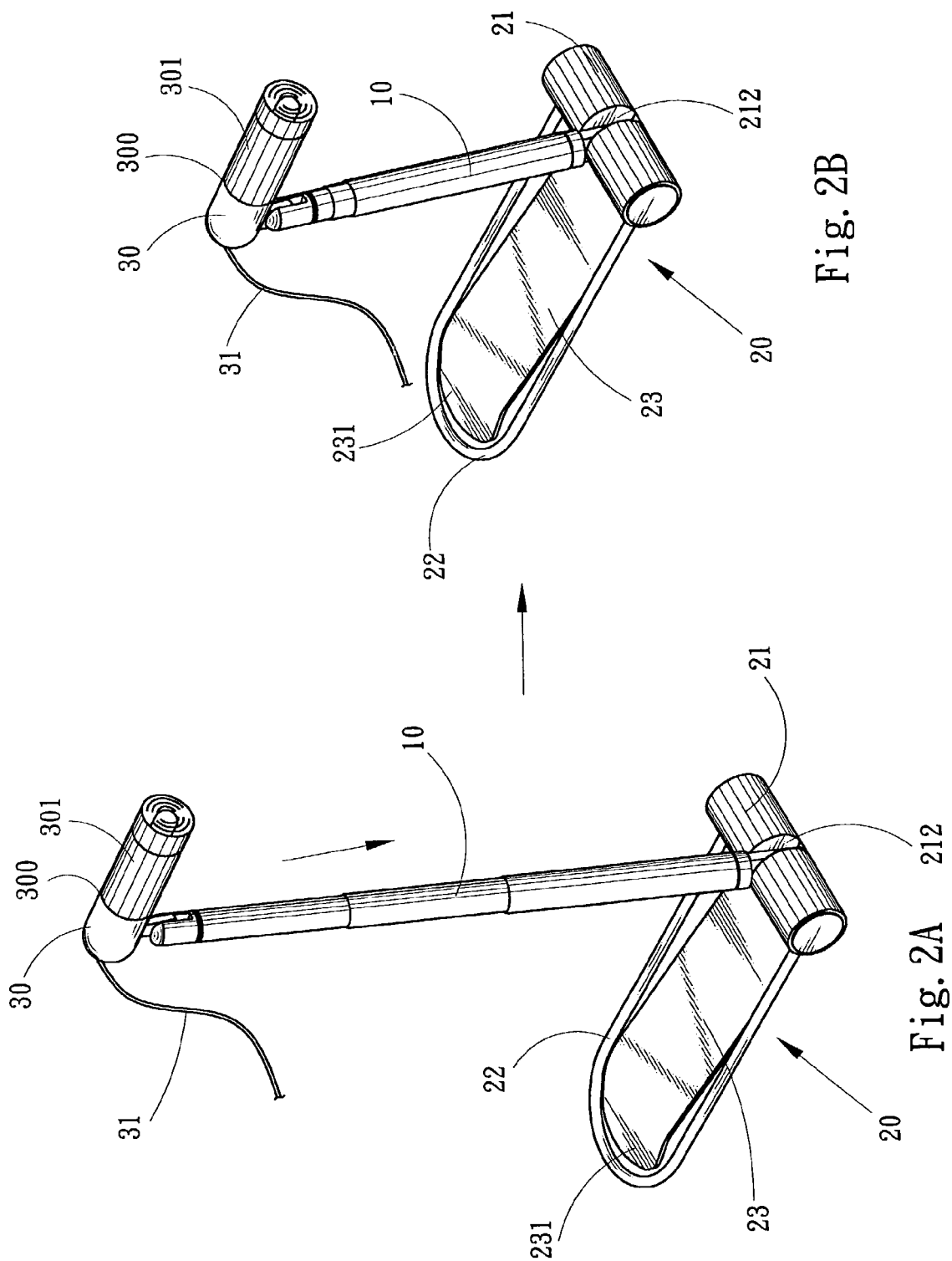

ELECTRIC APPLIANCE STAND WITH SIMPLE TELESCOPIC SUPPORT ROD

BACKGROUND OF THE INVENTION

The present invention is related to an electric appliance stand with simple telescopic support rod. A small-size electric appliance can be replaceably connected on a connecting seat of the stand and supported by the stand. The stand has small volume and can be conveniently carried.

Taiwanese Patent Publication No. 497688 discloses a desk lamp structure. Taiwanese Patent Publication No. 500212 discloses an ascending/descending structure of a desk lamp. Taiwanese Patent Publication No. 171040 discloses an ascending/descending connector structure of a vertical fan. In Taiwanese Patent Publication No. 497688, a clip is disposed on lower end face of the base seat. A lamp is connected to the upper end face of the base seat via a link. The link is flexible for adjusting the angle. The clip is formed with perforations for locking with the base seat by screws. The clip can clip a horizontal face or a vertical face. In Taiwanese Patent Publication No. 500212, a base seat is assembled with lower end an outer tube of the support stand. An upper end of an inner tube fitted in the outer tube is connected with the lamp shade of a lamp. The inner tube and outer tube form a telescopic structure for adjusting the height of the lamp. In Taiwanese Patent Publication No. 171040, a telescopic tube is nested in a sleeve of the base seat. A fan is connected with upper end of a connector. The connector is fitted through the telescopic tube and fixedly connected with the sleeve. The connector is screwed to fasten and locate the telescopic tube. All the above Patents have complicated structures with large volume. Moreover, the electric appliance such as the fan and the lamp is fixedly on the telescopic structure and cannot be easily replaced. It is inconvenient to use and store such electric appliance stand.

SUMMARY OF THE INVENTION

It is therefore a primary object of the present invention to provide an electric appliance stand with simple telescopic support rod, including a telescopic operable arm. A lower end of the operable arm is pivotally disposed on a base seat and an upper end of the operable arm is pivotally connected with a connecting seat. A small-size electric appliance can be replaceably connected on the connecting seat and supported by the stand. The operable arm is telescopic and swingable. Therefore, in both used state and stored state, the stand can be mobilely folded to have small volume. Accordingly, the electric appliance stand can be conveniently carried.

The present invention can be best understood through the following description and accompanying drawings wherein:

BRIEF DESCRIPTION OF THE DRAWINGS

FIG. 2A is a perspective view according to FIG. 1A, showing that the operable arm is telescoped out;

FIG. 2B is a perspective view according to FIG. 1A, showing that the operable arm is telescoped in;

FIG. 3B is a perspective view according to FIG. 1B, showing that the operable arm is telescoped in;

DETAILED DESCRIPTION OF THE PREFERRED EMBODIMENTS

Figure 1A:
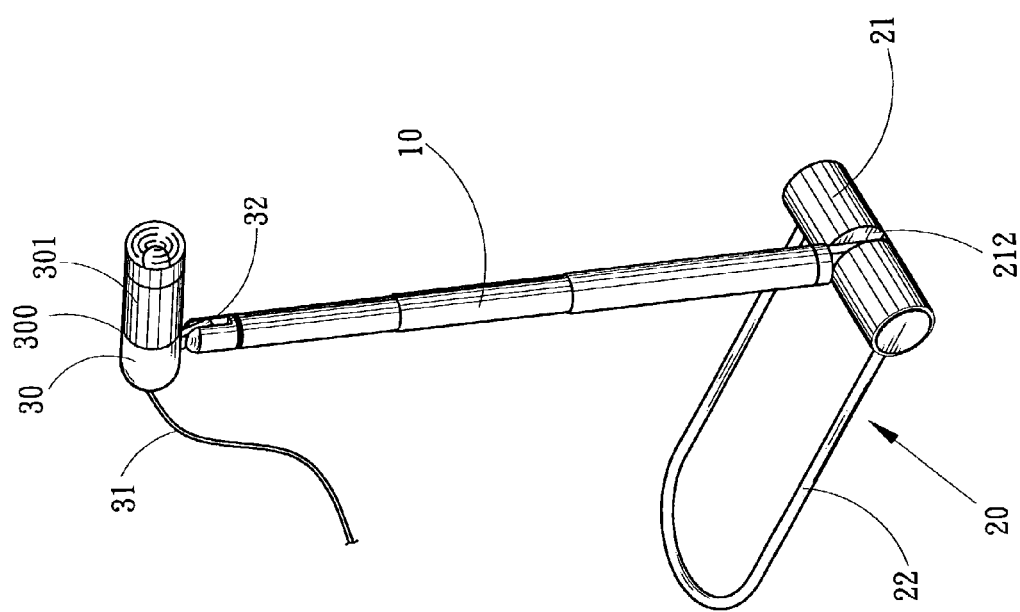
FIG. 1A is a perspective view of the present invention connected with a fan.

Please refer to FIGS. 1 to 4. The electric appliance stand with simple telescopic support rod of the present invention includes an operable arm 10, a base seat 20 and a connecting seat 30. The operable arm 10 is formed by a telescopic rod. The lower end of the operable arm 10 is pivotally disposed on the base seat 20. The upper end is pivotally connected with the connecting seat 30. The front end of the connecting seat 30 has a simple coupler 300 for connecting with an electric appliance. Accordingly, a small-size electric appliance can be replaceably connected with the stand.

A pivot lug 32 extends from lower side of the connecting seat 30 for pivotally connecting with upper end of the operable arm 10. The coupler 300 is adapted to connect with a minitype electric appliance such as a light emitting element 301 or a small fan 302. The rear end is connected with a power wire 31 for supplying power. The base seat 20 is composed of a locating block 21 and a support arm 22. A hinge member 212 is disposed on the locating block 21 for pivotally connecting with the lower end of the operable arm 10. The support arm 22 outward extends from the locating block 21 to form a stable seat body.

At least one slipproof ring 211 is fitted around the locating block 21. A slipproof sleeve 221 is fitted around an outward extending end of the support arm 22, whereby when placed on a polished surface, the stand is prevented from slipping.

Referring to FIGS. 2A to 4B, a clipping plate 23 is disposed on the locating block 21 and directed to the support arm 22. A tail end of the clipping plate 23 is formed with a guide slope 231. The clipping plate 23 and the support arm 22 together form a clip structure for clipping a thin article such as a book.

Figure 1B:
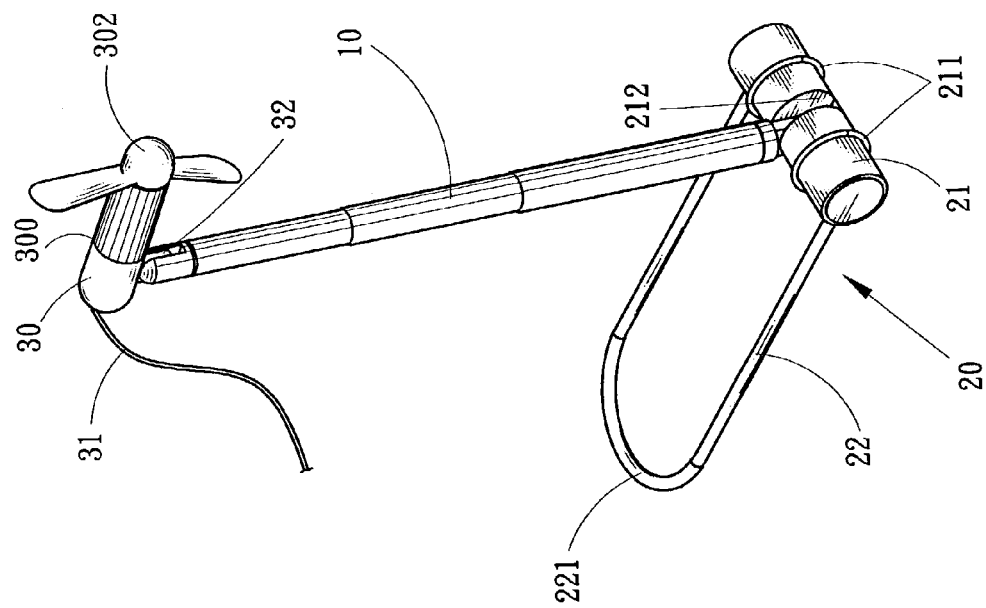
FIG. 1B is a perspective view of the present invention connected with a light emitting element.
Figure 3B:
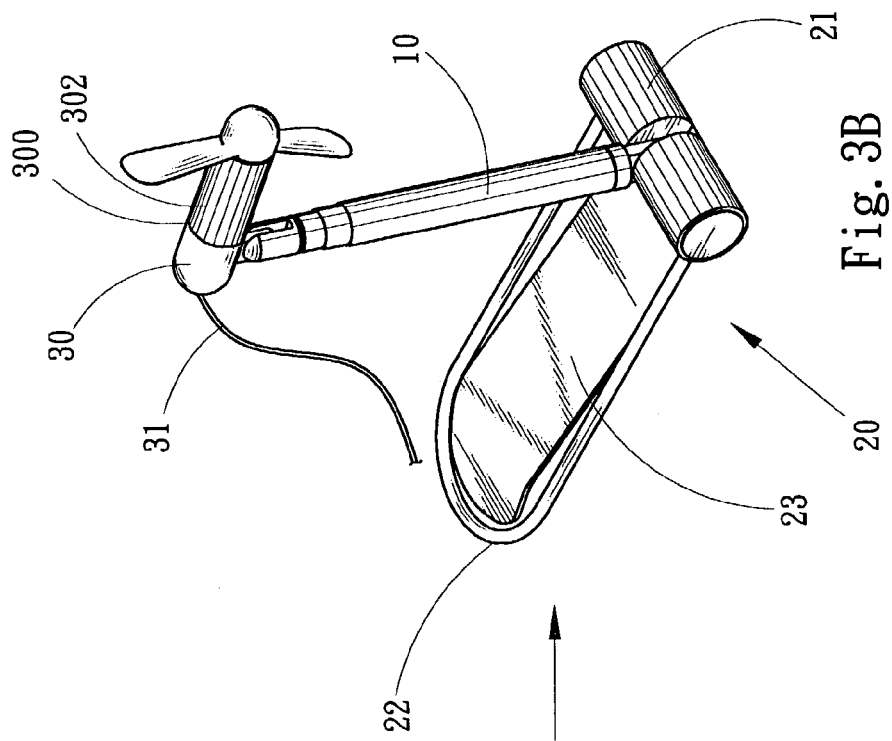
Figure 3A:
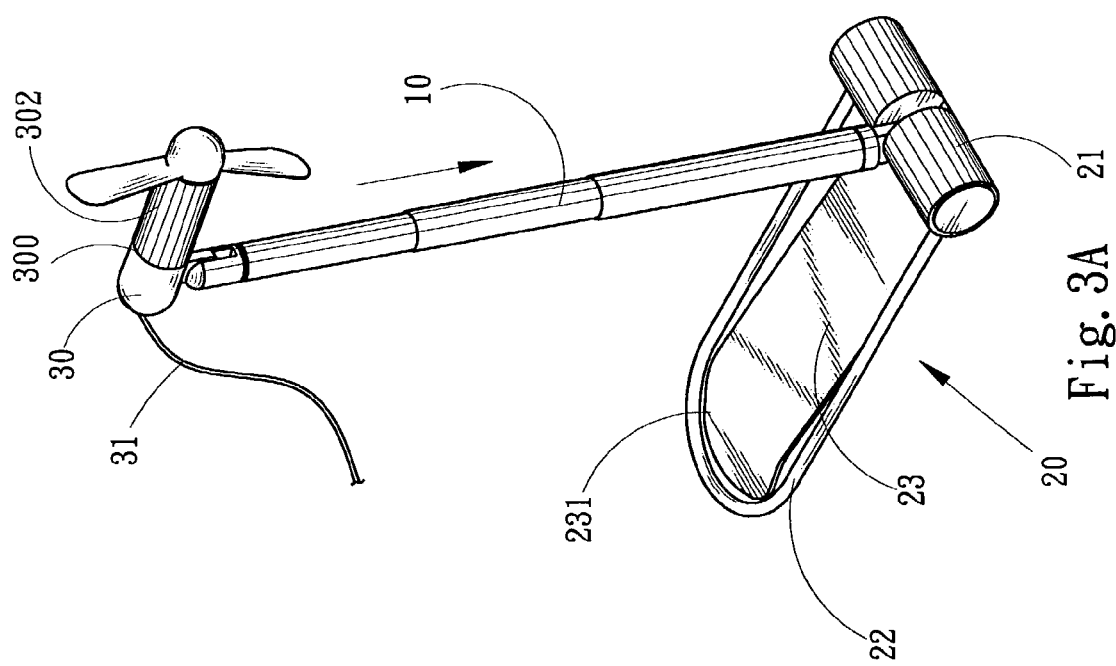
FIG. 3A is a perspective view according to FIG. 1B, showing that the operable arm is telescoped out.
Figures 4A, 4B:
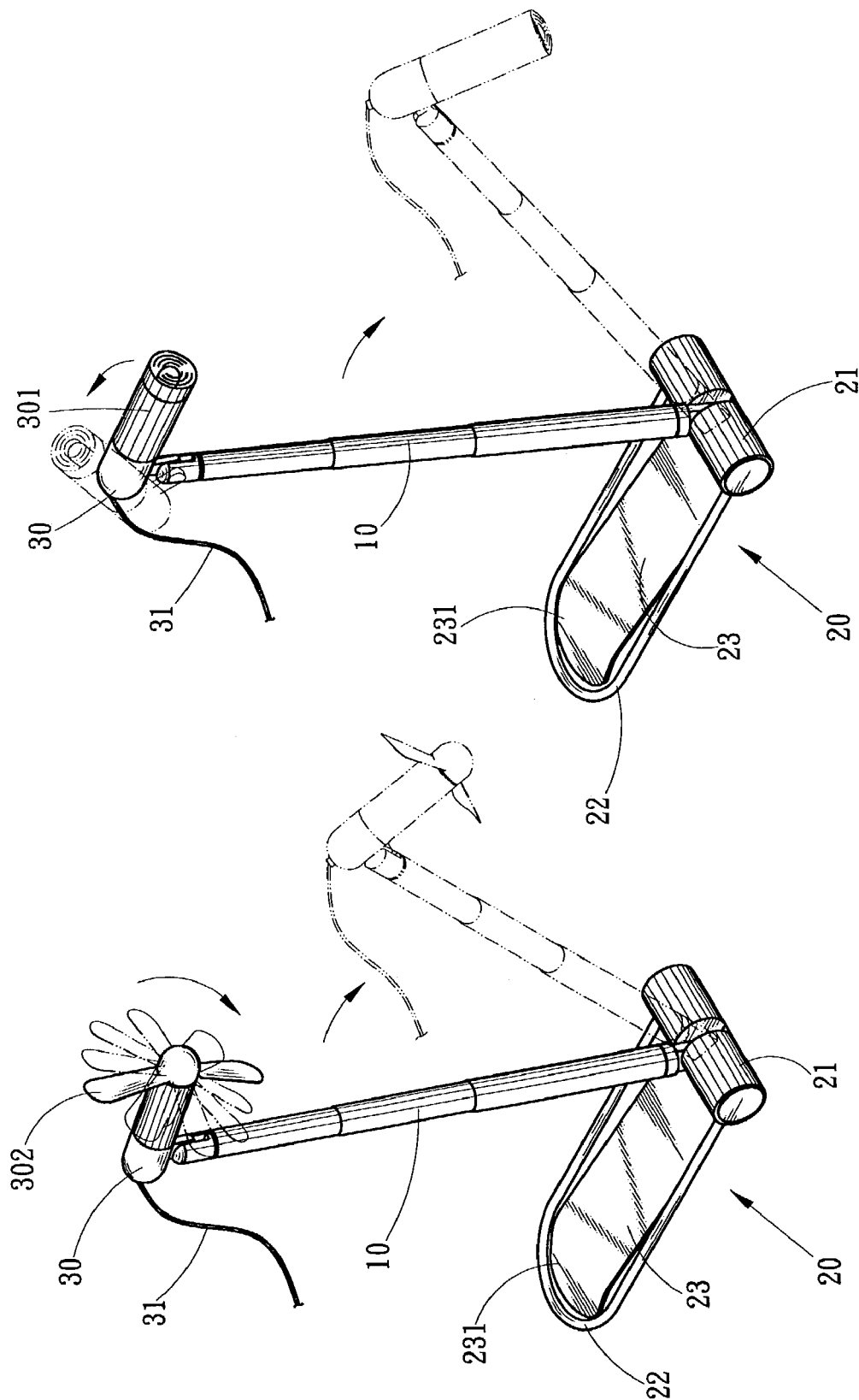
FIG. 4A is a perspective view according to FIG. 1A, showing that the operable arm is swung.
FIG. 4B is a perspective view according to FIG. 1B, showing that the operable arm is swung.

Referring to FIGS. 1 and 4, a mini type electric appliance such as a light emitting element 301 or a small fan 302 can be replaceably connected on the connecting seat 30. For example, the light emitting element 301 can be replaced with the small fan 302. Moreover, as shown in FIGS. 2A to 4B, the operable arm 10 can be telescoped to adjust the height and swung to adjust the angle. Also, the base seat 20 can be easily moved to adjust the position thereof. Alternatively, the clipping plate 23 and the support arm 22 can cooperatively clip a book. In use of after folded, the stand has small volume and can be conveniently carried.

The above embodiments are only used to illustrate the present invention, not intended to limit the scope thereof. Many modifications of the above embodiments can be made without departing from the spirit of the present invention.

What is claimed is:

1. An electric appliance stand comprising:
 a) an operable arm;
 b) a base seat pivotally connected to a first end of the operable arm; and having:

i) a locating block;
ii) a support arm extending outwardly from the locating block;
iii) a hinge member located on the locating block and pivotally connecting the base seat to the first end of the operable arm; and the operable arm being a telescoping rod; and
iv) at least one slipproof ring located around an outer circumference of the locating block and spaced apart from the telescoping rod;
c) a connecting seat pivotally connected to a second end of the operable arm and having:
i) a simple coupler connected to a first end of the connecting seat, the simple coupler removably connected to a small electrical appliance selected from the group consisting of a light emitting element and a small fan; and
ii) a power wire electrically connected to a second end of the connecting seat opposite the simple coupler to electrically connect the small electrical appliance to a power source through the connecting seat; and
d) at least one slipproof sleeve located around an outer circumference of the support arm.

2. The electric appliance stand according to claim 1, further comprising a pivot lug extending from a bottom of the connecting seat and pivotally connecting the connecting seat to the second end of the operable arm.

3. The electric appliance stand according to claim 1, further comprising a clipping device having a clipping plate connected at a first end to the locating block and extending outwardly from the locating block within an area defined by the support arm, such that a thin article is removable clipped between the clipping plate and the support arm.

4. The electric appliance stand according to claim 2, further comprising a clipping device having a clipping plate connected at a first end to the locating block and extending outwardly from the locating block within an area defined by the support arm, such that a thin article is removable clipped between the clipping plate and the support arm.

5. The electric appliance stand according to claim 3, wherein the clipping device includes a guide slope located on a second end of the clipping plate.

\* \* \* \* \*